June 17, 1969 LE ROY A. PROHOFSKY 3,450,900

DIGITAL SENSE AMPLIFIER

Filed June 28, 1966

INVENTOR
LEROY A. PROHOFSKY
BY Griffin and Branigan
ATTORNEYS

United States Patent Office 3,450,900

Patented June 17, 1969

3,450,900

DIGITAL SENSE AMPLIFIER

Le Roy A. Prohofsky, Minneapolis, Minn., assignor to Sperry Rand Corporation, New York, N.Y., a corporation of Delaware Filed June 28, 1966, Ser. No. 561,194
Int. Cl. H03k *17/16*
U.S. Cl. 307—239 11 Claims This invention relates to amplifier circuits and more particularly to digital sense amplifiers for amplifying and storing low level digital pulse signals. While the present invention has particular utility in computer systems and is hereinafter described in a computer environment, it will be appreciated that this is merely exemplary of its many uses. Generally, this invention is useful in any system wherein it is necessary to amplify small or low level pulses.

Figure 1:
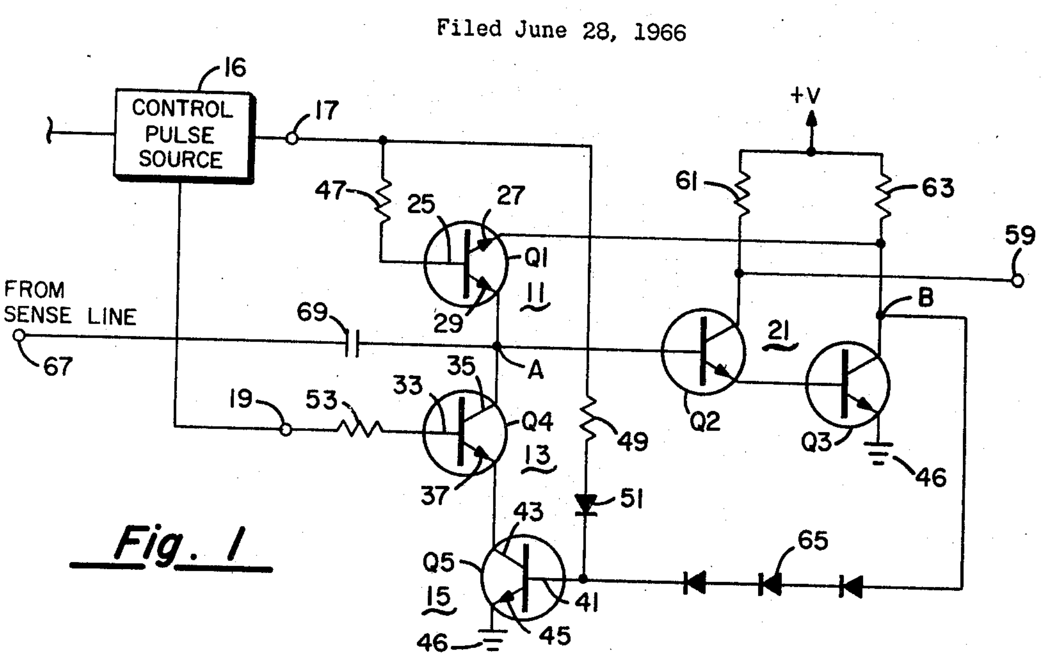

In recent years considerable effort has been expended for the purpose of developing smaller computer components such as thin film magnetic memories. However, as the size of the components has been reduced, there has been a resulting reduction in the signal levels of the components. Thus, a need has developed for amplifiers of the type capable of amplifying very low level pulse signals while discriminating between noise signals and low level data pulse signals. For example, during the time period of a thin film memory cycle when writing or when address selection takes place, transient or noise signals are induced in the sense or output line. These transient signals must not be detected by the sense amplifiers for if they are, they will be amplified by the sense amplifiers and erroneously supplied to other computer circuits as data signals. Subsequent to the time the noise signals are produced, the data signals are produced on the sense line. These signals are very low level signals and must be amplified before being applied to other computer circuits. The present invention provides means for amplifying the data signals but rejecting the noise signals.

Prior art computer systems generally require a memory buffer register. Upon readout of the magnetic memory the data signals induced in the sense lines are applied to the sense amplifiers where they are amplified before being applied to the bistable element of the buffer register. This register then stores the data signals so that they are available to other elements of the computer system. The present invention provides a sense amplifier which not only amplifies the output signals from the memory but also stores them until cleared by an external timing signal, thereby eliminating the need for a seperate buffer register.

Accordingly, it is an object of the invention to provide an improved digital sense amplifier for amplifying very low level signals.

It is a further object of the invention to provide a digital sense amplifier for use in amplifying and storing output signals from a magnetic memory.

It is another object of the invention to provide a digital sense amplifier that is simple and compact, is not affected by noise, and will digitize the signal at a low signal level so as to minimize the amount of linear amplification required.

It is a still further object of the invention to provide a digital sense amplifier that amplifies a low level digital signal and stores the amplified signal for an interval of time sufficient to allow it to be sampled by logic circuits in the computer.

The foregoing and other objects of the invention are accomplished by the provision of a unique digital sense amplifier. In accordance with a principle of the invention first, second, and third switches are connected between a voltage source and ground. An initiate control means is connected to and controls the bistable switching of the first and third switches. A sample control means is connected to control the switching of the second switch. Further, a switch amplifier is provided having a single input and three outputs which are switched by said input. The first output is adapted for connection to an output terminal while the second output is connected in a feedback manner to the first switch and the third output is connected to the control element of the third switch. An input from a sense signal source is connected to the junction between the first and second switches and the input to the switching amplifier. Through appropriate timing of the initiate and sample control signals in conjunction with a sense input signal, the sense signal is amplified at the output terminal while address switching noise signals are grounded. The output is a bi-level digital signal of a magnitude suitable for use by a digital logic system.

Further, the output signal is regenerated and is locked to either of its bi-level states. Hence, the system is a memory device as well as an amplifier.

Most prior art sense amplifiers detect the polarity of the sense signal relative to a fixed reference (usually ground). However, the present invention uses whatever arbitrary level exists at the beginning of a sample period as a reference and digitizes the sense signal on the basis of the sign of the voltage change occurring during the sample period irrespective of any excursion occurring before and after this period thereby eliminating the need for noise to entirely decay before the sense signal is sampled. Hence, another advantage of the invention is that noise does not have to entirely decay before a sense signal can be sampled to determine its polarity.

The foregoing objects and many of the attendant advantages of the invention will become more readily appreciated upon consideration of the following detailed description when taken in conjunction with the accompanying drawings wherein:

FIG. 1 is a circuit diagram of a preferred embodiment of the present invention; and FIGS. *2a–2e* are timing diagrams illustrating the switching operations of a preferred embodiment of the invention.

In FIG. 1, the sense amplifier circuit comprises a first switch means 11, a second switch means 13, a third switch means 15, a first or initiate control input 17, a second or sample control input 19, and a switching amplifier 21.

The first switch means comprises a complementary or bilateral transistor Q1 having a base 25, a first emitter 27 and a second emitter 29. The second switch means 13 comprises a second transistor Q4 having a base 33, a collector 35, and an emitter 37. The third switch means comprises a third transistor Q5 having a base 41, a collector 43 and an emitter 45. The second emitter 29 of the bilateral transistor Q1 is connected to the collector 35 of the second transistor Q4 and the emitter 37 of the second transistor is connected to the collector 43 of the third transistor Q5. The emitter 45 of the third transistor is connected to ground 46.

The initiate control input 17 is connected through a first resistor 47 to the base 25 of the bilateral transistor Q1 and is connected through a second resistor 49 in series with a forward biased diode 51 to the base 41 of the third transistor Q5. The sample control input 19 is connected through a third resistor 53 to the base 33 of the second transistor Q4.

The switching amplifier 21 comprises a fourth transistor Q2 and a fifth transistor Q3. The emitter of the fourth transistor is connected to the base of the fifth transistor and the emitter of the fifth transistor is connected to ground 46. The collector of transistor Q2 is connected to an output terminal 59. Further, the collector of transistor Q2 is connected through a fourth resistor 61 to a voltage source +V. The collector of the fifth transistor is connected to the first emitter 27 of the bilateral transistor Q1, through a fifth resistor 63 to the voltage source +V, and through a plurality of forward biased diodes 65 to the base 41 of the third transistor Q5.

A terminal 67, adapted for connection to a source of sense signals, is connected through a capacitor 69 to the base of the fourth transistor Q2. The second emitter of the bilateral transistor Q1 and the collector of the second transistor Q4 are also connected to the base of the fourth transistor.

The interconnection between the capacitor 69, and the second emitter 29 of the bilateral transistor, the collector 35 of the second transistor, and the base of the fourth transistor is designated by reference character A. Further, the reference character B is illustrated in FIG. 1 at the collector of the fifth transistor Q3.

Figure 2:
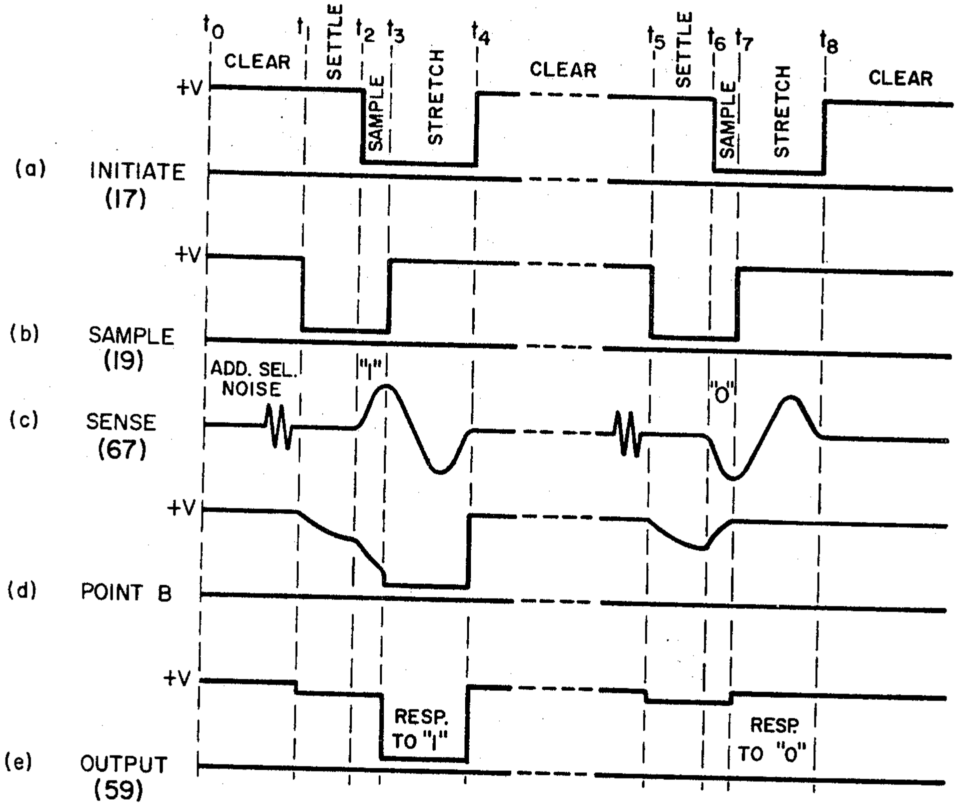

FIGS. 2d and 2e show the waveforms at point B and output terminal 59, respectively when the wave forms of FIGS. 2a, 2b, and 2c are applied to the initiate, sample, and sense input terminals, respectively. The initiate and sample signals 17 and 19 are generated in time synchronism with the memory cycle controls. The initiate and sample signals are preferably generated by the same control 16 which controls the memory readout cycle so that the sense amplifier performs its sensing and amplifying functions only during memory readout cycles.

FIGS. 2*a*–2*e* depict two complete cycles of operation of the sense amplifier. The first cycle, falling between time $t_0$ and $t_4$, illustrates the operation of the amplifier when a positive or binary "one" signal appears at sense input 67 while the second cycle falling between time $t_5$ and $t_8$ illustrates the operation of the amplifier when a negative or binary "zero" signal appears at sense input 67.

Each cycle of the amplifier is divided into four intervals designated clear, settle, sample, and stretch. With reference to the first cycle, the clear interval occurs between $t_0$ and $t_1$, the settle interval occurs between $t_1$ and $t_2$, the sample interval occurs between $t_2$ and $t_3$ and the stretch interval occurs between $t_3$ and $t_4$.

When address selection signals are applied to a thin film memory a certain amount of noise is generated on the sense output lines of the memory. These noise signals appear at input 67 during the clear interval occurring between $t_0$ and $t_1$. The sample and initiate signals are both positive during this interval to insure that the noise signals are not amplified and applied to the output of the sense amplifier. The sample signal is applied through resistor 53 to turn on transistor Q4 The initiate signal is applied through resistor 47 to turn on transistor Q1 and through resistor 49 and diode 51 to turn on transistor Q5

With transistors Q4 and Q5 both on, the point A is essentially at ground. Therefore, the address select or noise signals appearing at sense input 67 pass through condenser 69 and are shunted directly to ground so that they do not affect the sense amplifier output Once the address selection noise signals have started to decay the sense amplifier is brought to a class A operating point which is referenced to the base line of the sense signal. This occurs during the settle interval. At time $t_1$, the sample signal drops to zero voltage thus turning transistor Q4 off and breaking the direct connection between point A and ground. Current flows from +V through resistor 63 and the emitters of transistors Q1 to charge the condenser 69. As the condenser charges, the voltage at point A becomes more positive until the threshold of transistor Q2 is reached. At this time Q2 is turned on thereby turning Q3 on. At this point it should be noted that the voltage at output terminal 59 drops from +V to a value slightly less than +V when Q2 and Q3 are turned on. However, this voltage change is so slight as to be insignificant.

At the beginning of the settle interval all of the current flowing through resistor 63 is available for charging condenser 69. However, when Q3 begins conducting part of the current flowing through resistor 63 passes through Q3 to ground and the voltage at point B decreases. As the current through Q3 increases the current into point A decreases thereby tending to turn Q2 and Q3 off. Therefore, the feedback loop circuit including points A and B and transistors Q1, Q2, and Q3 soon reaches a condition of equilibrium with the point B being at some voltage intermediate ground and +V as shown in FIG. 2*d*. A near perfect equilibrium condition occurs because bilateral transistor Q1 allows current to flow freely from point B to point A and vice versa. It will be appreciated that if Q1 were a unilateral transistor allowing current to only flow from point B to point A a point near equilibrium might not be achieved; point A could become charged to a value above point B and if it did it would remain above point B.

Once the equilibrium condition is reached the circuit is sensitive to low level sense signals applied to terminal 67. However, the sense signals would cause a change in voltage at point B and through the action of the feedback loop through transistor Q1 point A would be brought back to the equilibrium condition. Stated differently, the feedback loop through Q1 would act to "regulate out" any change in voltage at point A caused by a signal on the sense winding. Therefore, Q1 is turned off at time $t_2$ which is the beginning of the sample interval and immediately prior to the time the memory applies the data signal to sense input 67. The initiate signal changes from +V to 0 volts to turn Q1 off and at the same time places Q5 under the control of the voltage at point B. As shown by FIG. 2*a*, point B is at some voltage less than +V, and at time $t_2$ is not great enough to maintain Q5 in its on state. Hence, at time $t_2$ transistor Q5 is off.

The signal at sense input 67 is sampled during the sample interval to determine whether it is positive or negative with respect to the voltage existing at point A at the end of the settle interval. The state of Q5 at the end of the sample interval indicates whether the sense input signal and point A are more positive or more negative.

As shown in FIG. 2*c* the signal appearing at sense input 67 is positive during the sample interval of the first cycle thus indicating a readout of a binary "one" from the memory. This drives point A more positive causing transistor Q3 to conduct more and causing the voltage at point B to decrease. The decreased voltage at point B keeps transistor Q5 off. At time $t_3$ the sample signal is again applied to transistor Q4. However, since transistor Q5 is off, the emitter of transistor Q4 is open and Q4 acts as a diode with the sample current flowing through the base and collector of Q4 to point A. This drives the voltage at point A further in the positive direction causing the voltage at point B to drop to a low level approaching zero. This voltage, in turn, holds Q5 off. Therefore, the circuit remains latched in this condition as long as the sample input voltage is high and the initiate input voltage 17 is low. This condition exists throughout the stretch interval ($t_3$ to $t_4$) and allows ample time for other logic circuits of the computer to sample and utilize the output of the sense amplifier. Therefore, it is obvious that the sense amplifier of the present invention performs the function of, and eliminates the need for, the conventional memory output buffer register.

As shown in FIG. 2*e*, the output voltage at terminal 59 drops to a low level at time $t_3$ when the sample signal flows through Q4 to point A thereby driving transistor Q2. This low voltage level at output 59 indicates that a binary "one" was read out of the memory. The voltage level at output 59 is maintained until time $t_4$ when the initiate signal 17 again goes to a high level and turns transistor Q5 on thereby connecting point A to ground.

When the initiate signal returns to its high level at time $t_4$ it also turns on Q1 thereby again completing the feedback circuit from point B to point A. With Q5 turned on point A is grounded thereby turning transistors Q2 and Q3 off. Therefore, at time $t_4$ the operating cycle is completed and all circuit elements have returned to the initial conditions existing at time $t_0$. These conditions remain stable until the next memory readout cycle occurs.

The preceding description illustrates the manner in which a binary "one" represented by a positive signal at sense input 67 during the sample interval is manifested at the sense amplifier output 59 as a low level signal during the stretch interval. On the other hand, if a negative signal representing a binary "zero" is applied to sense input 67 during the sample interval it is manifested at output 59 as a high level signal during the stretch interval. For the latter case the operation of the sense amplifier is illustrated in FIGS. 2*a*–2*e* by the waveforms in the interval between $t_4$ and $t_8$.

The operation of the sense amplifier is the same during the clear interval ($t_4$ to $t_5$) and the settle interval ($t_5$ to $t_6$). That is, during the clear interval both the initiate and sample signals are at a high level thus holding Q4 and Q5 on thereby grounding point A and shunting the address selection noise signals to ground. Further, at the beginning of the settle interval the sample signal drops to a low level thus opening the grounding circuit of point A and allowing the amplifier ot settle to a class A operating point through the action of the feedback circuit from point B through Q1 to point A. Therefore, at the end of the settle interval Q1, Q2, and Q3 are on, Q5 is off, output 59 is at a high level, and point B is at a voltage level less than +V this voltage level being insufficient to maintain Q5 in the on condition.

At the beginning of the sample interval the voltage at sense input 67 drops thus indicating a binary zero readout from the memory. At the same time, the initiate signal 17 drops to a low level thus turning off Q1 and leaving Q5 under the control of the voltage at point B. The decreasing voltage at sense input 67 turns off transistor Q2 which in turn cuts off transistor Q3. When transistor Q2 turns off the sense amplifier output 59 rises to +V and when transistor Q3 turns off the voltage at point B rises to +V thus turning transistor Q5 on.

The sample interval ends and the stretch interval begins at time $t_7$ when the sample signal 19 is returned to the high level thus turning transistor Q4 on. With both Q4 and Q5 on point A is grounded thereby holding Q2 and Q3 off and causing the output voltage at 59 to remain at +V throughout the stretch interval. Therefore, the high level at output 59 may be sampled by other logic circuits at any time during the stretch interval to provide an indication that a binary zero was read out of the memory.

The memory cycle for reading out a zero ends at time $t_8$ when the initiate signal 17 again shifts to the upper voltage level to turn on Q1. The initiate signal is also applied to the base of Q5 to turn it on but the signal has no effect at this time since Q5 is already being held on by the high level voltage at point B. It will be recognized by those skilled in the art that the time $t_8$ (or $t_4$) of the sense amplifier cycle may actually be made to occur at the beginning of the next memory readout cycle so that the stretch interval of the sense amplifier cycle actually overlaps the latter portion of one memory readout cycle and the beginning portion of the next succeeding memory cycle. This permits the sense amplifier to store a binary 1 or 0 indication from the time it is read out to sense input 67 until after the next memory readout cycle has been initiated.

In summary, the state that the amplifier of the invention will assume during the stretch period is determined by the condition of Q5 at $t_3$ (or $t_7$). If the Q5 base bias is large enough to allow Q5 to ground more current than flows through resistor 53 then current will also flow out of point A and a "0" will be established. If Q5 cannot ground all of the sample current, the excess current will flow into point A and a "1" will be established. This defines the threshold for the circuit of the invention. There is an associated threshold at point B which controls the operation of Q5.

The $V_{be}$ drops of Q2 and Q3 along with the $V_{sat}$ of Q1 determines the equilibrium voltage of point B. Since the threshold and equilibrium voltage of point B cannot be made exactly the same, the signal ($\Delta V$ during the sample period) must overcome this difference.

The condition to correctly detect the signal is then:

$$\Delta V > \frac{V_{eq} - V_{th}}{A}$$

where $\Delta V$=voltage change during the sample period
$V_{eq}$=equilibrium voltage of point B
$V_{th}$=threshold voltage of point B
A=voltage gain of Q2 and Q3

From the foregoing description it is evident that the present invention provides a simple and reliable device for sensing very low level output signals from a magnetic memory, amplifying them, and storing them for any desired interval of time. Further, the invention provides means for eliminating the adverse effect of address selection noise signals on the sense amplifier output. Although a specific embodiment has been shown and described to illustrate the principles of the invention, it will be evident that various modifications falling within the spirit and scope of the invention can be made. Accordingly, it is intended to be limited only by the scope of the appended claims.

The embodiments of the invention in which an exclusive property or privilege is claimed are defined as follows:

1. A low level digital pulse amplifier comprising:
first switching means;
second switching means;
third switching means;
first input means connected to said first and third switching means for applying a control signal to said first and third switching means;
second input means connected to said second switching means for applying a control signal to said second switching means;
said first, second, and third switching means being connected in series with a voltage source, said voltage source being connected to said first switching means;
amplifier switching means having one input and three outputs for switching all of said outputs from one state to a second state in accordance with an input signal;
third input means for applying a signal both to the series junction between said first and second switching means and for applying a signal to the input of said amplifier switching means;
the first output of said amplifier switching means being connected to said voltage source;
the second output of said amplifier switching means being connected to the junction between said first switching means and said voltage source; and
the third output from said amplifier switching means being connected to said third switching means to provide a second source of control signals for said third switching means.

2. Apparatus as claimed in claim 1 wherein said first switching means comprises:
a bilateral transistor having a base connected to said first input means, a first emitter connected to said voltage source, and a second emitter connected to said third input means.

3. Apparatus as claimed in claim 2 wherein said second switching means comprises:
a transistor having its base connected to said second input means, its collector connected to said third input means, and its emitter connected to said third switching means.

4. Apparatus as claimed in claim 3 wherein said third switching means comprises:

a transistor having its base connected to said first input means, its collector connected to the emitter of the transistor comprising said second switching means, and its emitter adapted for connection to ground.

5. Apparatus as claimed in claim 4 wherein said amplifier switching means comprises:

a first transistor;

a second transistor;

the base of said first transistor connected to said third input means, the collector of said first transistor connected to said voltage source and adapted for connection to an output terminal, and the emitter of said first transistor connected to the base of said second transistor;

said second transistor having its emitter adapted for connection to ground and its collector connected both to the first emitter of the transistor comprising said first switching means and to the base of the transistor comprising said third switching means.

6. Apparatus as claimed in claim 5 including:

a series combination of a resistor and a forward biased diode connected between said first input means and the base of the transistor comprising said third switching means.

7. Apparatus as claimed in claim 6 including:

at least one diode forward biased connected between the collector of the second transistor of said amplifier switching means and the base of the transistor comprising said third switching means.

8. A digital pulse amplifier comprising:

an amplifier means having an input and first and second outputs, a feedback loop including a first switching means connected between said second output and said input, second and third switching means connected between said input and a source of reference potential, means for intermittently applying a first control signal to said first switching means to intermittently connect and disconnect said second output and said input, means for applying an input signal to said input as said input and second output are disconnected, means connecting said second output to said third switching means to activate said third switching means when said input signal has one polarity and to block said third switching means when said input signal has the opposite polarity, means for applying a second control signal to said second switching means to thereby connect said input to said reference potential during the interval following occurrence of said input signal when said input signal has said one polarity, said second switching means applying said second control signal to said input to drive said input in the same direction as said input signal when said input signal has said opposite polarity.

9. A digital pulse amplifier as claimed in claim 8 and further including a voltage source connected to said amplifier means and said feedback loop.

10. A digital pulse amplifier as claimed in claim 8 wherein said means for applying said first control signal includes means for simultaneously applying said first control signal to both said first and said third switching means.

11. A digital pulse amplifier as claimed in claim 10 wherein said means producing said first and said second control signals include means for concurrently activating said second and said third switching means to thereby connect said input to said reference potential.

References Cited

UNITED STATES PATENTS

| | | | |
|---|---|---|---|
| 3,078,395 | 2/1963 | Fraipont | 307—250 |
| 3,198,964 | 9/1968 | Grunwaldt | 307—250 |

ARTHUR GAUSS, *Primary Examiner.*

B. P. DAVIS, *Assistant Examiner.*

U.S. Cl. X.R.

307—250; 328—165